No. 841,533. PATENTED JAN. 15, 1907.
Y. KAWASAKI.
BISCUIT FORMING AND BAKING DEVICE.
APPLICATION FILED JUNE 28, 1906.
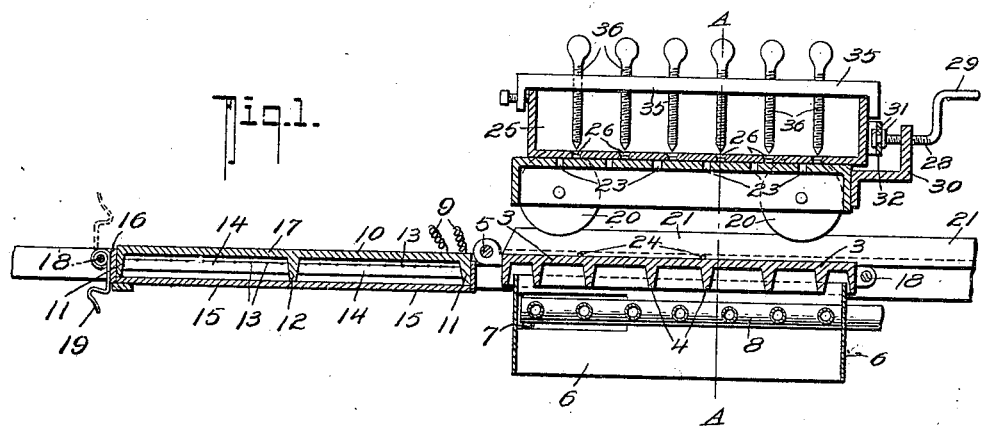
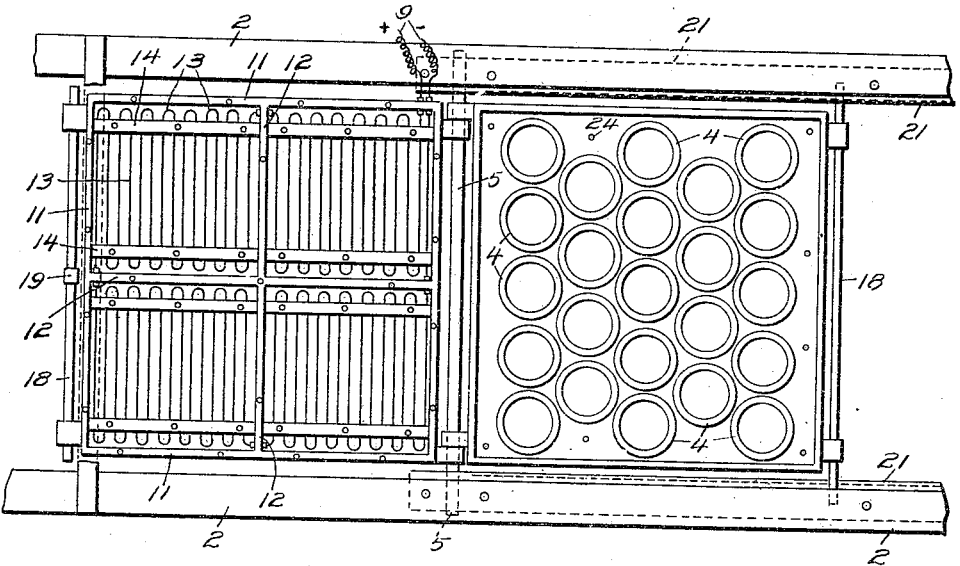
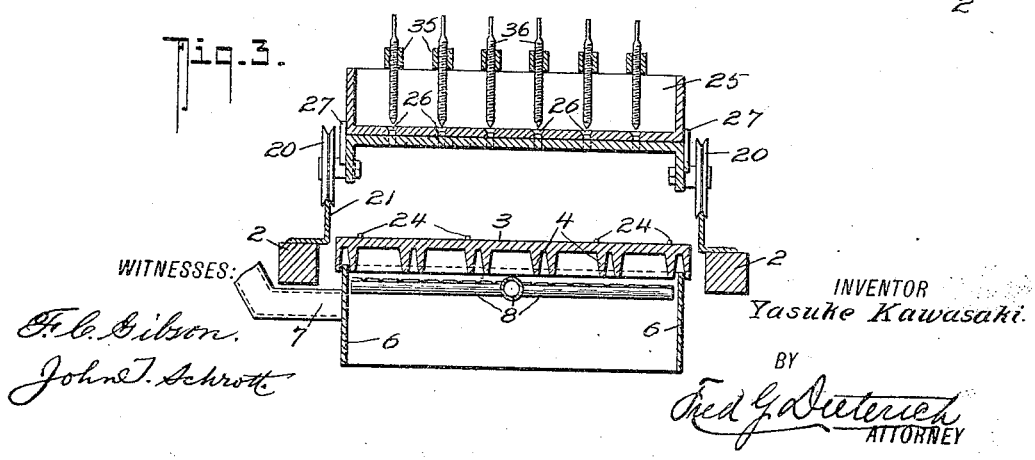
WITNESSES:
F. C. Gibson.
John T. Schrott.
INVENTOR
Yasuke Kawasaki.
BY
Fred G. Dieterich
ATTORNEY
THE NORRIS PETERS CO., WASHINGTON, D. C.

UNITED STATES PATENT OFFICE.

YASUKE KAWASAKI, OF VANCOUVER, BRITISH COLUMBIA, CANADA.

BISCUIT FORMING AND BAKING DEVICE.

No. 841,533.     Specification of Letters Patent.     Patented Jan. 15, 1907.

Application filed June 28, 1906. Serial No. 323,971.

*To all whom it may concern:*

Be it known that I, YASUKE KAWASAKI, a citizen of the Empire of Japan, residing at the city of Vancouver, in the Province of British Columbia, Canada, have invented a new and useful Biscuit Forming and Baking Device, of which the following is a specification.

This invention relates to a means for forming and baking thin wafer biscuits of that kind known in Japanese confectionery as "Senbe." These are a thin circular wafer made from a fluid batter having a large proportion of sugar in its composition, and this excess of sugar renders it necessary that great care be taken in the baking of the wafer; otherwise they are liable to burn or stick to the metal of the plates between which they are baked.

In the ordinary method of manufacture as followed by the Japanese the fluid batter is poured between two small flat plates of metal hinged together, which plates are heated over a charcoal fire before the batter is poured between them and are thereafter again held over the fire and carefully turned until the baking is completed. This process is a slow and tedious one and requires both care and skill on the part of the operator in judging the heat and the required exposure to it necessary to effect the desired purpose without burning.

My invention has therefore been directed to the provision of means whereby a considerable number of wafers may be simultaneously formed and baked, to the means whereby the plates are uniformly heated and maintained at the desired temperature, to the arrangement of the heating-plates that between each operation they may be readily opened for the necessary cleaning and oiling of their surfaces, and to the means whereby the batter from which the wafers are to be made shall be simultaneously allowed to flow in the required amount from a box or tank of batter through a series of separate outlets upon the heated base-plate. The manner in which I attain these several objects is fully set forth in the following specification, reference being made to the drawings by which it is accompanied, in which—

Figure 1 is a vertical longitudinal section through the device complete. Fig. 2 is a top plan view of my invention, the batter-holding box being removed. Fig. 3 is a cross-section on the line *a a* of Fig. 1.

Supported on an open frame 2 at a convenient height from the floor for the operator is a plate 3, having a machined upper surface and strengthened in a manner that will avoid as much as possible any warping of the plate under the application of heat. The manner which I have found most suitable for the strengthening of the lower plate is that illustrated in the inverted plan in Fig. 3, the plate 3 being cast with a series of ringed webs 4, separate from one another, but interprojecting in plan to afford the necessary rigidity in any plane of bending. This plate 3 may be secured to or rest upon the side frame 2, but is preferably hinged thereto at 5, and beneath it is an open-box casing 6, of light sheet metal, in which is a Bunsen gas-burner 8, the fumes from which are carried away by the flue 7.

Hinged to the plate 3 on the pin 5, which rests in the side frame 2, is the upper heating-plate 10. This plate 10 is formed of light metal having a downwardly-flanged border 11 and cross-webs 12, which divide it into rectangular divisions. Within these divisions is secured on suitable insulation 14 an electrical heating resistance-wire 13, which passes horizontally back and forth across the length and breadth of the plate 10 and is connected at the terminals 9 toward the hinge-pin 5 to an external electric circuit from which the heat-generating current is derived. The back of the plate is provided with a heat-non-conducting cover 15, which non-conducting covering may also be carried round the edge borders 11, as at 16, to retain all the heat within the plate save at the exposed machined plane surface 17.

Mounted on wheels 20 to run on a light wheel-track 21, secured to the side frame 2, is a suitably-strengthened plate 22, the upper face of which is machined to a true plane, and through this plate are uniformly distributed apertures 23, corresponding to the number of wafers the heating-plates are designed to accommodate.

Endwise slidable on the upper face of the plate 22 is the batter-holding box 25, the under surface of the bottom of which is machined to a true plane and provided with countersunk apertures 26, corresponding to those of the plate 22. The batter-box 25 is retained laterally by guide members 27 and is endwise movable on the plate 22 by means of a screw 28, having a crank-handle 29, the screw being threaded through a bracket 30, secured at the center of one end of the plate 22. The end of this screw 28 engages between collars 31 a member 32, secured to the end of the batter-box 25. By this screw 28 the batter-box 25 may be moved endwise on the plate 22 a sufficient amount to bring the apertures 26 of the box 25 in register with the apertures 23 of the plate 22 or to close them as required.

Secured on the upper edge of the sides of the box 25 are bars 35, through which at intervals corresponding with the apertures 26 of the bottom are screws 36, having conical lower ends, which may be introduced into the countersink of the apertures 26 to regulate the amount of batter which may flow through the apertures.

In the operation of the device the plates 3 and 10 lie open, as represented in Fig. 1, and the lower plate 3 being heated by the gas-burner 8 and the upper plate 10 by the electric current through the resistance-wires 13 to the required temperature the batter-box 25 on its carriage-plate 22 is run on its track to a position immediately over the lower plate 3, and by means of the handle 29 the register of the apertures 23 and 26 is operated to allow the required amount of batter to flow on the plate 3, over which it will spread in a series of thin circular flows. The batter-box on its carriage is then run clear of the plates, and by means of a handle-rod 18 the upper plate 10 is turned on the hinge-pin 5 and lowered upon the plate 3, on which it is tightly pressed and secured in any suitable manner, such as the hook member 19 on one handle-rod engaging the one of the other plate, the distance apart of the plates being determined by means of small pin-stops 24, introduced in one or both of the plates. The fluid batter, which has spread itself over the plate 3 in a series of circular disks, is flattened to a uniform and desired thickness, and the wafers are baked by the united and sustained heat of the two plates between which they are pressed.

By using a gas-burner of the form illustrated for the heating of the lower plate I am enabled to maintain that plate at a uniform temperature and to effect the economy of that method of heating, and by using electrical resistance-wires as a means for heating the upper plate I can maintain that plate at a constant temperature during the operation of baking and avoid the intermittent heating which would otherwise be necessary. I am thus enabled to have the machine in constant operation and obtain a greater daily output with a minimum of labor, and that not especially skilled.

I am aware that prior to my invention wafers or biscuits of a like kind have been formed in multiple molds between heated plates; but such have had a distinct mold recessed in one or both of the plates, and the heating of the plates has been periodic.

I am aware also that confections have been formed by multiple apertures in the bottom of a box containing the liquid or plastic material, through which apertures the material has been allowed to flow or has been pressed into molds beneath; but with none of these does my invention conflict, as in my device the batter flows upon a uniformly and constantly heated plane surface and is flattened and spread thereon by a similar uniformly and constantly heated plane-surfaced plate which is pressed upon the first mentioned plate.

Having now particularly described my invention and the manner of its operation, I hereby declare that what I claim as new, and desire to be protected in by Letters Patent, is—

1. As a means for forming and baking wafer biscuits of the class described; the combination with upper and lower plane-surfaced plates hinged together so that the plates may be laid open and their adjacent surfaces exposed, means for maintaining both plates at a constant temperature whether open apart, or closed one on the other, stops to regulate the distance apart of the plates when closed one on the other, means for securing the plates tightly together in the closed position, an open batter-containing box mounted on wheels and a track so as to be movable over one of the plates, the bottom of such box having a series of apertures through it, and means for simultaneously opening and closing said apertures.

2. As a means for forming and baking wafer biscuits; the combination with plane-surfaced plates hinged together so that one may be folded on the other, means for uniformly and uninterruptedly heating said plates, a batter-holding receptacle movable over one of said plates, said receptacle having a series of apertures through its bottom, and means for opening and closing said apertures.

3. As a means for forming and baking wafer biscuits; the combination with plane-surfaced plates hinged that the plane surfaces may be exposed upward or closed one on the other, means for uniformly and uninterruptedly heating said plates, a batter-holding receptacle having a series of apertures through its bottom said receptacle being movable on a carriage which itself is movable over one or other of the plates and has a plane surface provided with apertures corresponding with those in the bottom of the aforementioned receptacle, and means for moving the receptacle, in relation to its carriage so as to open or close the apertures in the bottom of the receptacle.

4. As a means for forming and baking wafer biscuits; the combination with plane-surfaced plates hinged that the plane surfaces may be exposed upward or closed one on the other, means for uniformly and uninterruptedly heating said plates, a batter-holding receptacle movable over one or other of the plates having a series of apertures in the bottom which may be opened or closed, bridge-bars across the receptacle having a series of screws threaded therethrough corresponding to the apertures in the bottom of the receptacle, said screws having conical lower ends which may be inserted in the apertures to regulate the flow of the batter through them.

In testimony whereof I have signed my name to this specification in the presence of two subscribing witnesses.

YASUKE KAWASAKI.

Witnesses:
    ROLAND BRITTAIN,
    ELLICE WEBBER.